United States Patent
Coic (10) Patent No.: US 10,419,885 B2
(45) Date of Patent: Sep. 17, 2019

(54) COMMUNICATION DEVICE AND METHOD, AND COMPUTER PROGRAM PRODUCT FOR ASSOCIATING A MOBILE TELEPHONY IDENTIFIER AND A COMPUTER NETWORK IDENTIFIER

(71) Applicant: INTERSEC, Paris la Defense (FR)

(72) Inventor: Jean-Marc Coic, Bourg la Reine (FR)

(73) Assignee: INTERSEC, Paris la Defense (FR)

( * ) Notice: Subject to any disclaimer, the term of this patent is extended or adjusted under 35 U.S.C. 154(b) by 0 days.

(21) Appl. No.: 15/765,384

(22) PCT Filed: Sep. 27, 2016

(86) PCT No.: PCT/FR2016/052448
§ 371 (c)(1),
(2) Date: Apr. 2, 2018

(87) PCT Pub. No.: WO2017/055730
PCT Pub. Date: Apr. 6, 2017

(65) Prior Publication Data
US 2018/0310134 A1    Oct. 25, 2018

(30) Foreign Application Priority Data
Oct. 2, 2015  (FR) ...................... 15 59392

(51) Int. Cl.
*H04W 4/02*   (2018.01)
*H04W 4/029*  (2018.01)
(Continued)

(52) U.S. Cl.
CPC ........... *H04W 4/027* (2013.01); *H04W 4/021* (2013.01); *H04W 4/029* (2018.02); *H04W 8/26* (2013.01);
(Continued)

(58) Field of Classification Search
None
See application file for complete search history.

(56) References Cited

U.S. PATENT DOCUMENTS

2008/0091977 A1* 4/2008 Miguelanez ........ G06F 11/2257
714/37
2008/0227465 A1* 9/2008 Wachter ................ H04W 4/029
455/456.1
(Continued)

FOREIGN PATENT DOCUMENTS

WO    2013028143 A1    2/2013

OTHER PUBLICATIONS

Morris et al; "Learning Trajectory Patterns by Clustering: Experimental Studies and Comparative Evaluation"; University of California; 2009; pp. 312-319.
(Continued)

*Primary Examiner* — German Viana Di Prisco
(74) *Attorney, Agent, or Firm* — Ohlandt, Greeley, Ruggiero & Perle, L.L.P.

(57) ABSTRACT

A communication device includes: a memory for receiving event data associating signaling data, a time marker and a mobile telephony identifier or a computer network identifier; an extractor arranged to calculate trajectory data on the basis of the signaling data that signal event data comprising time markers designating consecutive times associated with a single mobile telephony identifier or a single computer network identifier; and a matcher arranged to calculate a similarity value between trajectory data, and to associate at least one mobile telephony identifier and one computer network identifier based on the similarity value calculated for trajectory data associated therewith.

18 Claims, 5 Drawing Sheets

(51) Int. Cl.
*H04W 4/021* (2018.01)
*H04W 88/06* (2009.01)
*H04W 8/26* (2009.01)
*H04W 64/00* (2009.01)

(52) U.S. Cl.
CPC ......... *H04W 64/006* (2013.01); *H04W 88/06* (2013.01)

(56) References Cited

U.S. PATENT DOCUMENTS

| | | | |
|---|---|---|---|
| 2013/0084862 A1* | 4/2013 | Zou | H04W 64/00 455/436 |
| 2013/0124333 A1 | 5/2013 | Doughty et al. | |
| 2014/0114561 A1 | 4/2014 | Pakzad et al. | |
| 2014/0221004 A1* | 8/2014 | Goldfarb | H04W 4/02 455/456.1 |
| 2015/0099469 A1* | 4/2015 | Goldstein | H04W 4/21 455/41.2 |
| 2017/0142547 A1* | 5/2017 | Hou | G06F 7/02 |

OTHER PUBLICATIONS

International Search Report dated Dec. 19, 2016 for PCT application No. PCT/FR2016/052448.

\* cited by examiner

COMMUNICATION DEVICE AND METHOD, AND COMPUTER PROGRAM PRODUCT FOR ASSOCIATING A MOBILE TELEPHONY IDENTIFIER AND A COMPUTER NETWORK IDENTIFIER

CROSS REFERENCE TO RELATED APPLICATIONS

This application claims the benefit of French Patent Application No. 1559392 filed on Oct. 2, 2015.

BACKGROUND OF THE DISCLOSURE

1. Field of the Disclosure

The invention relates to the field of telecommunications, and more particularly of passively geolocated communication.

2. Description of Related Art

Many devices are now provided with both telephone and computer telecommunication interfaces. For example, most modern telephones have both a telephony chip (2G, 3G, 4G, etc.), and a radio chip allowing connection to a WiFi network.

The applicant has specialized in the analysis of telephone network data making it possible to provide geolocation data, in particular through the analysis of the signaling data transmitted during the interaction of a telecommunication device with a telephony network.

Connections to computer networks, for example of WiFi type, also make it possible to provide geolocation services, also through analysis of the signaling with the computer network.

In view of the disclosure, applicant envisions it could be very advantageous to manage to use the telephony and/or computer network geolocation data to communicate with the telecommunication devices most efficiently.

For example, that would make it possible to transmit emergency information (fire, weather or the like) to the telecommunication devices, when one of the two networks is down or ineffective, or to ensure a maximum broadcast. Other cases of use can also be envisaged.

However, no solution exists for associating the mobile telephony identifier and the computer network identifier of a telecommunication device. Indeed, the mobile telephony identifier is generally associated with a SIM card that is independent of the telecommunication device.

SUMMARY OF THE DISCLOSURE

The invention improves the situation. To this end, the invention proposes a communication device which comprises a memory for receiving event data associating signaling data, a time marker, and a mobile telephony identifier or a computer network identifier, an extractor arranged to calculate trajectory data, from the event data signaling data comprising time markers designating consecutive instants associated with a unique mobile telephony identifier or a unique computer network identifier, and a matcher arranged to calculate a similarity value between trajectory data, and to associate at least one mobile telephony identifier and one computer network identifier as a function of the similarity value calculated for trajectory data which are associated with them.

This device is advantageous because it makes it possible to anonymously and reliably associate a mobile telephony identifier and a computer network identifier. It thus becomes possible, by geofencing, to communicate with a telecommunication device more efficiently.

In some variants, the device will be able to have one or more of the following features:

- the matcher discards the trajectory data associated with a mobile telephony identifier or with a computer network identifier which designate one and the same position and which, for a given time period, exhibit a number of occurrences above a chosen threshold,
- the matcher calculates the similarity value from a distance chosen from a group comprising the DTIV, the LCSS and the PF distance,
- the matcher associates a given mobile telephony identifier with a given computer network identifier when the similarity value of their associated trajectory data is below a chosen threshold,
- the matcher dissociates a mobile telephony identifier from a computer network identifier, which identifiers are associated, when the similarity value between the trajectory data associated with said mobile telephony identifier and trajectory data associated with another computer network identifier or the similarity value between the trajectory data associated with said computer network identifier and trajectory data associated with another mobile telephony identifier is below a chosen threshold,
- the device further comprises a transmitter arranged, upon detection of a computer network identifier associated by the matcher with a mobile telephony identifier, to transmit a telephone message of text or multimedia type to the device designated by said mobile telephony identifier,
- the device further comprises a transmitter arranged, upon detection of a mobile telephony identifier associated by the matcher with a computer network identifier, to transmit a computer message of text or multimedia type to the device designated by said computer network identifier,
- the memory is arranged to receive signaling data associating mobile communication device identifiers, time markers and signaling identifiers, at least some of the signaling identifiers designating a location cell, and wherein the extractor comprises:
  - a classifier capable, for a given mobile communication device identifier, of marking the signaling data which are associated with it with a displacement marker indicating a state chosen from a list comprising at least a movement and a short stop,
  - an analyzer capable of processing the marked signaling data as a function of the displacement markers in order to produce trajectory data associating, on the one hand, a given mobile communication device identifier and, on the other hand, a series of displacement markers each associated with a location cell and with a time marker, such that two displacement markers whose time markers indicate that they follow one another designate distinct states, by applying at least one of the following rules:
  - a) the modification of any displacement markers into displacement markers indicating a short stop, when, for two displacement markers indicating a short stop associated with a single location cell, the number of displacement markers whose time markers indicate that they are between these two displacement markers is less than or equal to 4,
  - b) the modification of displacement markers indicating a movement into displacement markers indicating a short stop when the time markers which are associated with them indicate that they are preceded and followed by displacement markers indicating a short stop and that the time markers associated with the latter indicate a duration below a first threshold, c) the modification of displacement markers indicating a movement into displacement markers indicating a short stop when the time markers which are associated with them indicate that they are preceded and followed by displacement markers indicating a short stop which are associated with one and the same location cell and that the time markers associated with the latter indicate a duration below a second threshold, d) the modification of displacement markers indicating a short stop into displacement markers indicating a movement when the time markers which are associated with them indicate that they are preceded and followed by displacement markers indicating a movement and that the time markers associated with the latter indicate a duration below a third threshold, e) the merging of displacement markers indicating a short stop whose time markers indicate that they are consecutive, and the association with the resulting displacement marker of the location cell associated with the displacement markers whose time markers represent the greatest duration and a time marker corresponding to the sum of the durations of the associated time markers, and the classifier and the analyzer are called sequentially to produce trajectory data, and/or wherein the analyzer applies the rule a) before applying the rule b), and/or the analyzer applies the rule b) before applying the vile c), and/or wherein the analyzer applies the rule c) before applying the rule d) and/or wherein the analyzer applies one of the rules a), b), c) and d) before applying the rule e).

The invention relates also to a mobile communication method comprising the following operations:

a. receiving event data associating signaling data, a time marker, and a mobile telephony identifier or a computer network identifier, b. calculating trajectory data, from the event data signaling data comprising time markers designating consecutive instants associated with a unique mobile telephony identifier or a unique computer network identifier, c. calculating a similarity value between trajectory data associated on the one hand with a mobile telephony identifier and on the other hand with a computer network identifier, and d. associating at least one mobile telephony identifier and one computer network identifier as a function of the similarity value calculated for trajectory data which are associated with them.

In certain variants, the method will be able to have one or more of the following features:

the operation d. comprises the association of a given mobile telephony identifier with a given computer network identifier when the similarity value of their associated trajectory data is below a chosen threshold, the operation d. comprises the disassociation of a mobile telephony identifier from a computer network identifier, which identifiers are associated, when the similarity value between the trajectory data associated with said mobile telephony identifier and trajectory data associated with another computer network identifier or the similarity value between the trajectory data associated with said computer network identifier and trajectory data associated with another mobile telephony identifier is below a chosen threshold, the method further comprises the operation of:

e. detecting a mobile telephony identifier associated in the operation d. with a computer network identifier and transmitting in response a computer message of text or multimedia type to the device designated by said computer network identifier, and the method further comprises the operation of:

f. detecting a computer network identifier associated in the operation d. with a mobile telephony identifier and transmitting in response a telephone message of text or multimedia type to the device designated by said mobile telephony identifier.

The invention relates also to a computer program product comprising program code portions for implementing the device or the method according to the invention when said program is run on a computer.

BRIEF DESCRIPTION OF THE DRAWINGS

Other features and advantages of the invention will become more clearly apparent on reading the following description, drawn from examples given in an illustrative and nonlimiting manner, drawn from the drawings in which.

DETAILED DESCRIPTION OF THE DISCLOSURE

The drawings and the description hereinbelow mostly contain elements of definite character. They will therefore be able not only to be used to give a better understanding of the present invention, but also to contribute to its definition, if necessary.

The present description intrinsically involves elements susceptible to protection by royalties and/or copyright. The holder of the rights has no objection to the unedited reproduction by anyone of the present patent document or its description, as it appears in the official files. For the rest, it reserves all its rights.

Figure 1:
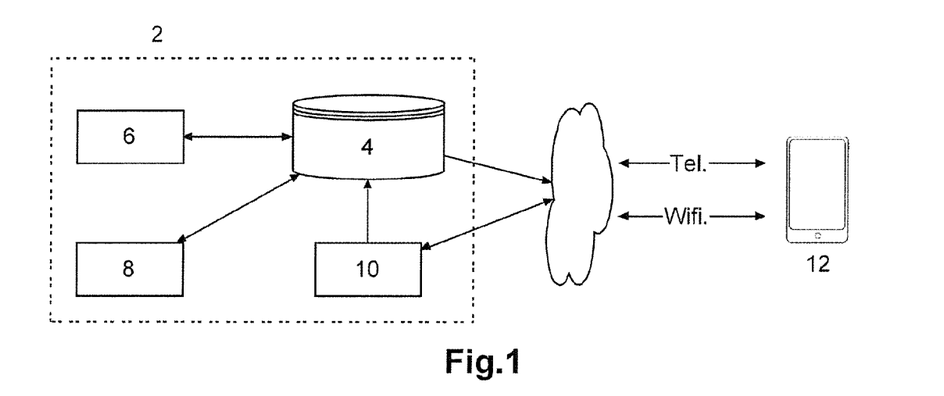
FIG. 1 represents a schematic view of a device according to the invention.

FIG. 1 represents a schematic view of a trajectory determination device according to the invention.

The device 2 comprises a memory 4, an extractor 6, a matcher 8 and a transmitter 10. The device 2 uses the data exchanged by a plurality of mobile devices 12 with a mobile telephony network on the one hand, and with a computer network on the other hand.

In the example described here, the extractor 6, the matcher 8 and the transmitter 10 are elements directly or indirectly accessing the memory 4. They can be produced in the form of an appropriate computer code executed on one or more processors.

In the example described here, the memory 4 receives data from a mobile telephony operator (whether GSM, GPRS, EDGE, UMTS, LTE, or the evolution thereof), as well as data from a computer network operator (for example an extended WiFi network of "hotspot" or other type). The memory 4 contains all the signaling and activity data of one, several or all the geographical zones served by the mobile telephony operator and the computer network operator.

The memory 4 can be directly accessible or remote, distributed over one or more sites, correspond to the aggregation of several distinct storages, including belonging to several operators pooling their resources. The memory 4 can be any type of data storage designed to receive digital data: hard disk, solid-state drive (SSD), flash memory in any form, random access memory, magnetic disk, storage distributed locally or in the cloud, etc. The data calculated by the device can be stored on any type of memory similar to the memory 4, or on the latter. These data can be erased after the device has performed its tasks, or retained.

The signaling data associate a mobile communication device identifier, a signaling identifier and a time marker. The time marker can be a raw marker or be accompanied by a duration. The mobile communication devices can be any device connecting to a GSM, GPRS, EDGE, UMTS, LTE mobile telephony network or the evolution thereof, and to a computer network, for example an extended WiFi network of "hotspot" type. The signaling identifiers can be derived from any signaling on these networks, or from a triangulation based on these identifiers, and/or from GPS type data communicated by the device. In the case of mobile telephony, the signaling data are obtained by analysis of the exchanges between a device and the mobile telephony network to which it is connected. In the case of the computer network, the data can be harvested passively, that is to say that the device does not need to be connected, its network search interactions being sufficient, without the user needing to identify him or herself or connect.

Processors should be understood to mean any processor suitable for the calculations described hereinbelow. Such a processor can be produced in any known manner, in the form of a microprocessor for a personal computer, of a dedicated chip of FPGA or SoC (system on chip) type, of a grid computation device, of a microcontroller, or of any form designed to provide the computation power necessary for the production described below. One or more of these elements can also be produced in the form of custom electronic circuits such as an ASIC. A combination of processor and of electronic circuits can also be envisaged.

Figure 2:
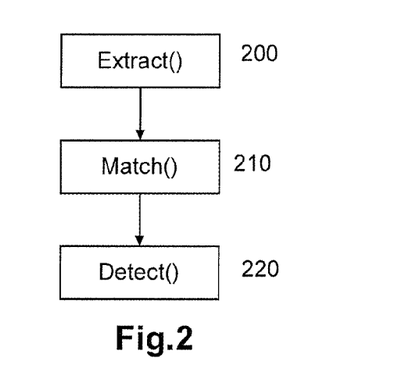
FIG. 2 represents an example of implementation of the device according to the invention.

FIG. 2 represents an example of operation of the device 2. In an operation 200, the extractor 6 executes a function Extract( ). The function Extract( ) accesses the signaling data in the memory 4 and determines trajectory data for all of the mobile telephony identifiers and for all of the computer network identifiers. An exemplary embodiment of the extractor 6 and of its implementation is described with FIGS. 3 to 9.

Next, in an operation 210, the matcher 8 executes a function Match( ) which compares the trajectory data derived from the operation 200 with one another, and derives therefrom a plurality of pairs which each associate a mobile telephony identifier and a computer network identifier. An example of implementation of the matcher 8 is described with FIG. 10.

Finally, in an operation 220, the transmitter 10 executes a function Detect( ) which analyzes the mobile telephony identifiers and the computer network identifiers in a chosen zone, and communicates in a chosen manner with the detected devices whose mobile telephony identifier and/or computer network identifier belong to a pair derived from the operation 210.

In the example described here, the execution of the operations 200 and 210 is chronological, that is to say that the matcher 8 executes the Match( ) function only when all the trajectory data have been determined in the operation 200. However, in some variants, this operation could begin as soon as a chosen number of trajectory data has been determined. Likewise, the operation 220 is executed only after the operation 210 is finished. However, here again, according to some variants, these two operations could be executed partly simultaneously.

Finally, FIG. 2 should not be viewed statically: in order to be as effective as possible, the device 2 will be able to regularly relaunch the execution of the operations 200 and 210 to maintain a list of pairs of mobile telephony identifiers and computer network identifiers that is as up to date as possible. During this update, the operation 220 will be able to continue to be executed with the existing pairs.

Hereinbelow, the mobile telephony identifier used is an identifier linked to the SIM card making it possible to connect the device to the mobile telephony network. As a variant, this identifier can be any identifier which makes it possible to unequivocally identify a device on a mobile telephony network. Likewise, the computer network identifier is the MAC address of the interface that makes it possible to access the computer network. Here again, depending on the computer networks, other identifiers will be able to be used.

Figure 3:
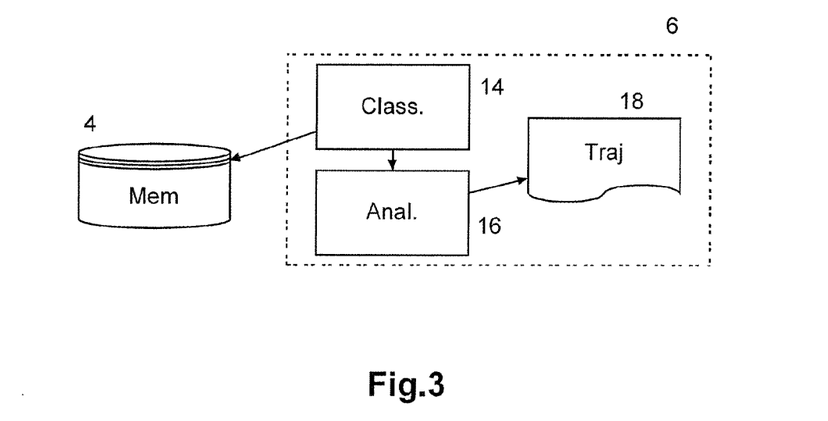
FIG. 3 represents a schematic view of an embodiment of the extractor of FIG. 1.

FIG. 3 represents a schematic view of an embodiment of the extractor 6, which comprises a classifier 14 and an analyzer 16 which together produce trajectory data 18.

The extractor 6 will, initially, analyze the signaling data associated with each mobile telephony identifier and with each computer network identifier in order to attach a displacement marker to the location cell corresponding to the signaling identifiers and to the associated time markers. This triplet constitutes what will hereinafter be called an event.

Figure 4:
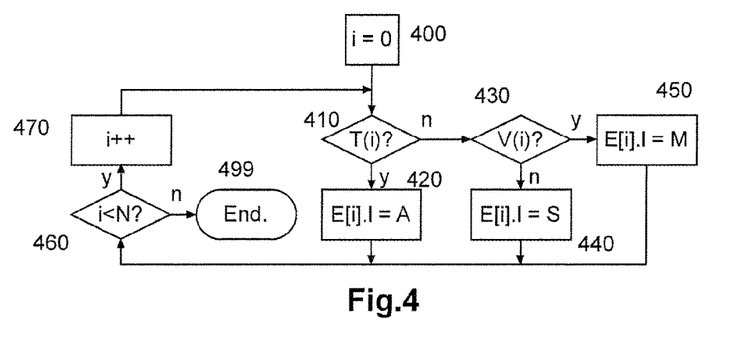
FIG. 4 represents an example of implementation of a function by the classifier of FIG. 3, FIGS. 5 to 9 represent examples of implementation of functions by the analyzer of FIG. 3.

FIG. 4 represents an example of a function implemented by the classifier 14 to produce that.

In an operation 400, the classifier 14 initializes a loop index i at 0. Next, in an operation 410, a function T( ) is executed to analyze the time marker associated with the signaling identifier of index i. The function T( ) determines the time which has elapsed between the time marker associated with the signaling identifier of index i and the preceding marker. If the duration is above a chosen threshold (for example greater than 4 hours, or 6 hours, or more), then, in an operation 420, a displacement marker of long stop type is associated with the location cell and with the time marker associated with the signaling identifier of index i.

The time markers of long stop type are important because they are used to "subdivide" the series of events. Thus, all the processing operations described hereinbelow relate to sequences of events situated between two events indicating a long stop. At the very least, as soon as a long stop is detected, two sequences are generated which will be processed independently.

Otherwise, in an operation 430, a function V( ) is executed to determine the difference of position between the location cell associated with the signaling identifier of index i and that associated with the preceding signaling identifier of index i. If the function V( ) indicates that the speed of displacement between these location cells is less than a speed threshold, equal to approximately 10 km/h for example, then, in an operation 440, a displacement marker of short stop type is associated with the location cell and with the time marker associated with the signaling identifier of index i. Otherwise, in an operation 450, a displacement marker of movement type is associated with the location cell and with the time marker associated with the signaling identifier of index i. Thus, the events designate pairs of signaling identifiers associated with one and the same mobile communication device and temporally consecutive, and an event is of movement type only if the speed of displacement perceived is at least as fast as a walking speed. As a variant, the function V( ) could determine whether the location cell has not changed between the two successive signaling identifiers instead of being based on the speed of displacement.

After the association of a marker by one of the operations 420, 440 or 450, an operation 460 tests whether all the signaling identifiers have been browsed. When that is not the case, the index i is incremented in an operation 470. Otherwise, the function terminates in an operation 499.

Once all the data have been marked, the device 2 can proceed with the processing thereof. Indeed, many signaling data may not represent a displacement of a person. For example, a communication device may be surrounded by several antennas, and, for various reasons, be attached in succession to various of these antennas, without in any way being displaced. In this case, the signaling data will indicate distinct location cells, which suggests a displacement, while the communication device (and therefore its user) has not been displaced. Many other particular cases which add noise may exist and must be processed to obtain reliable trajectory data.

The examples of functions represented in FIGS. 5 to 9 show how the analyzer 16 processes the marked data to derive trajectory data therefrom.

Figure 5:
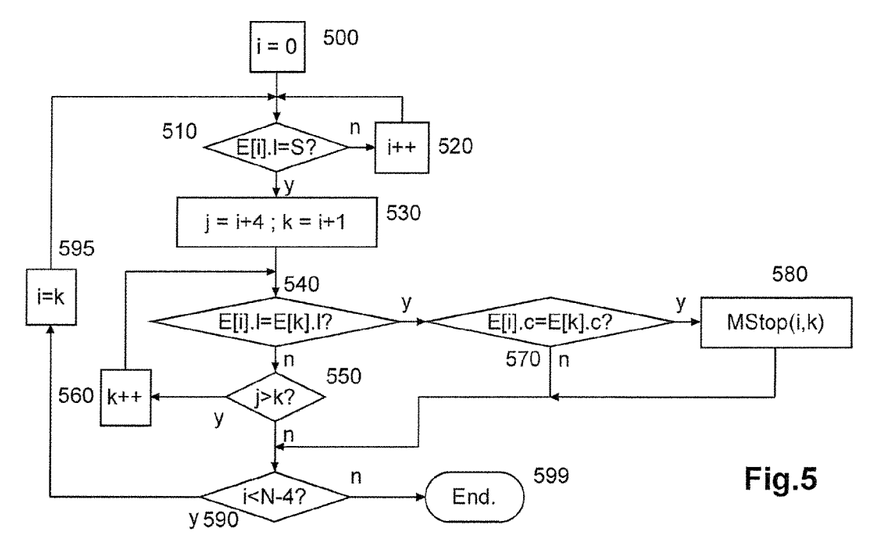

FIG. 5 represents an example of implementation of a first function. This function deals with the case described above. Thus, when, between two location data for which the displacement marker indicates a short stop in one and the same location cell and which are separated by fewer than four events, all the displacement markers are converted into short stop.

Thus, in an operation 500, a loop index i is initialized at 0. Next, in an operation 510, a test is carried out to determine if the event of index i has a displacement marker E[i].1 which indicates a short stop, or not. As long as this is not the case, the index i is incremented in an operation 520 and the test of the operation 510 is repeated.

As soon as a short stop is detected, an index j is defined with the value i uprated by 4, and a loop index k is defined with the value i uprated by 1 in an operation 530. Next, a loop determines whether there is an event between i and j which is also a short stop. For that, a test is carried out in an operation 540. As long as this test is not positive, a test in an operation 550 checks that k is less than j, and k is incremented in an operation 560.

When a short stop is found, a test in an operation 570 checks whether the two events E[i] and E[k] share the same location cell. If such is the case, then there are indeed two events with a displacement marker of short stop type, and which are separated by fewer than four events. Then, a function MStop( ) receiving i and k as arguments transforms all the displacement markers E[n].1 into short stop, with n lying between i and k.

Next, or when the operation 550 determines that there are no events of short stop type at fewer than 4 events from the event i, or when the location cells of the event i and that of the event k are distinct, a test in an operation 590 checks whether there still remain four operations for relaunching a loop. If there are, then, in an operation 595, the index i is updated with the index k and the loop restarts with the operation 510. Otherwise, the function is terminated in an operation 599.

Figure 6:
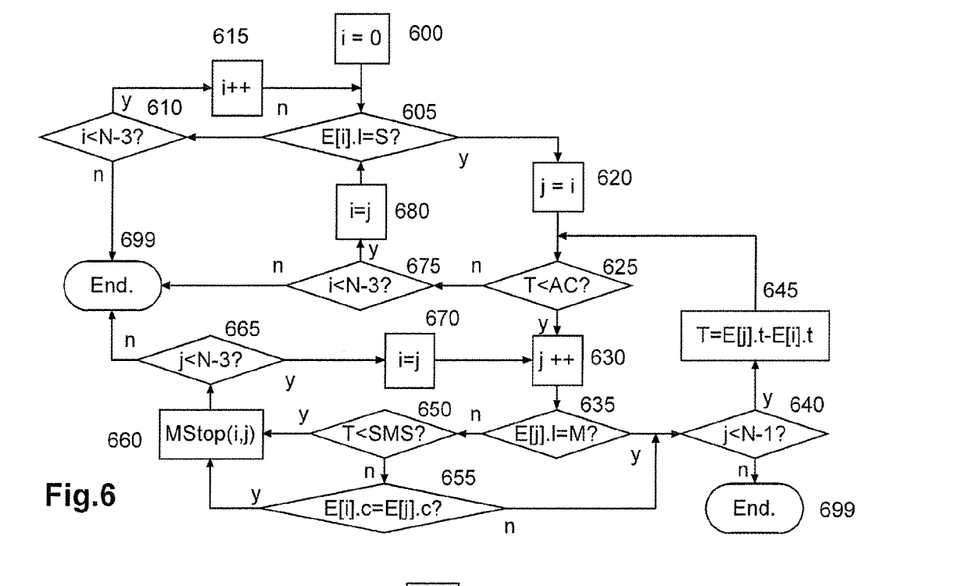

FIG. 6 represents another example of a function implemented by the analyzer 16. Indeed, when two events whose displacement markers indicate a short stop are separated by a duration, and these events are separated by a duration below a first threshold making it possible to switch from one cell to another, or the two events are associated with the same location cell but their time markers are separated by a duration above a second threshold indicating that the round trip to a neighboring cell was not possible, then all the events among these are modified such that their displacement marker indicates a short stop.

Thus, in an operation 600, a loop index i is initialized at 0. Next, in an operation 605, a test is carried out to determine whether the event of current index i is associated with a short stop or not. As long as this test is negative, an operation 610 tests whether there remain at least three events (since the function searches for at least one event out of two events of short stop type), and, if such is the case, the index i is incremented in an operation 615 and the test of the operation 605 is repeated. If such is not the case, the function is terminated in an operation 699.

When an event whose displacement marker indicates a short stop is found, a loop with two tests is launched in order to try to verify whether one of the above two conditions is fulfilled. For that, in an operation 620, an index j equal to i is defined.

Next, a loop begins in which two conditions are sought. If one of these two conditions is fulfilled, then the events situated between the two temporally most extreme events are modified to mark them as corresponding to a short stop.

Thus, in an operation 625, the least constraining stop condition is tested, by comparing a duration T which indicates the difference between the time marker of the event of current index j and that of the event of index i. If the duration T is below this first threshold AC, then the index j is incremented in an operation 630.

Then, in an operation 635, a test determines whether the event of index j indicates a movement or a short stop. If it is a movement, then, in an operation 640, a test determines whether the event of index j is or is not the last. If such is the case, then the function is terminated with the operation 699. Otherwise, a duration T corresponding to the difference between the time marker of the event of index i and the event of index j is calculated in an operation 645, then the loop restarts with the operation 625, until an event indicating a short stop is encountered in the operation 635.

When a second event indicating a short stop is found in the operation 635, a test in an operation 650 determines whether the duration T is below a second threshold SMS. If such is the case, then the second condition (the most constraining) is fulfilled, and, in an operation 660, the function MStop( ) is called with the indexes i and j to modify the displacement markers of the events between these indexes to short stop. Next, a test is carried out in an operation 665 to determine whether there still remain three events in the list E[], as for the operation 610.

If such is not the case, then a test is carried out in an operation 655 to determine whether the events of indexes i and j concern the same location cell. If such is the case, then the first condition is fulfilled, and, in an operation 660, the function MStop( ) is called with the indexes i and j to modify the displacement markers of the events between these indexes to short stop, then the test of the operation 665 is carried out.

If the test of the operation 655 is negative, then the loop is continued with the operation 640 until the first condition is fulfilled or the duration T exceeds the first threshold AC, or the operation 640 indicates the end of the loop.

Finally, when the test of the operation 665 is positive, then the index i is updated with the value of the index j (since the event of index j indicates a short stop) in an operation 670, and the loop restarts with the operation 630.

The first threshold AC and the second threshold SMS are planned such that AC is greater than SMS. The first threshold AC makes it possible to detect the cases indicating a change of cell then a return to the original cell, whereas the time needed for that (the time corresponding to the first threshold AC) was insufficient. Similarly, the second threshold SMS designates an estimated time necessary to switch from one cell to another neighboring cell.

In the example described here, the first threshold AC is approximately 10 minutes, whereas the second threshold SMS is approximately 6 minutes. Thus, the function will transform into short stops the events associated with a movement lying between two events associated with a short stop and separated by less than 6 (second threshold SMS) or 10 minutes (first threshold AC).

Figure 7:
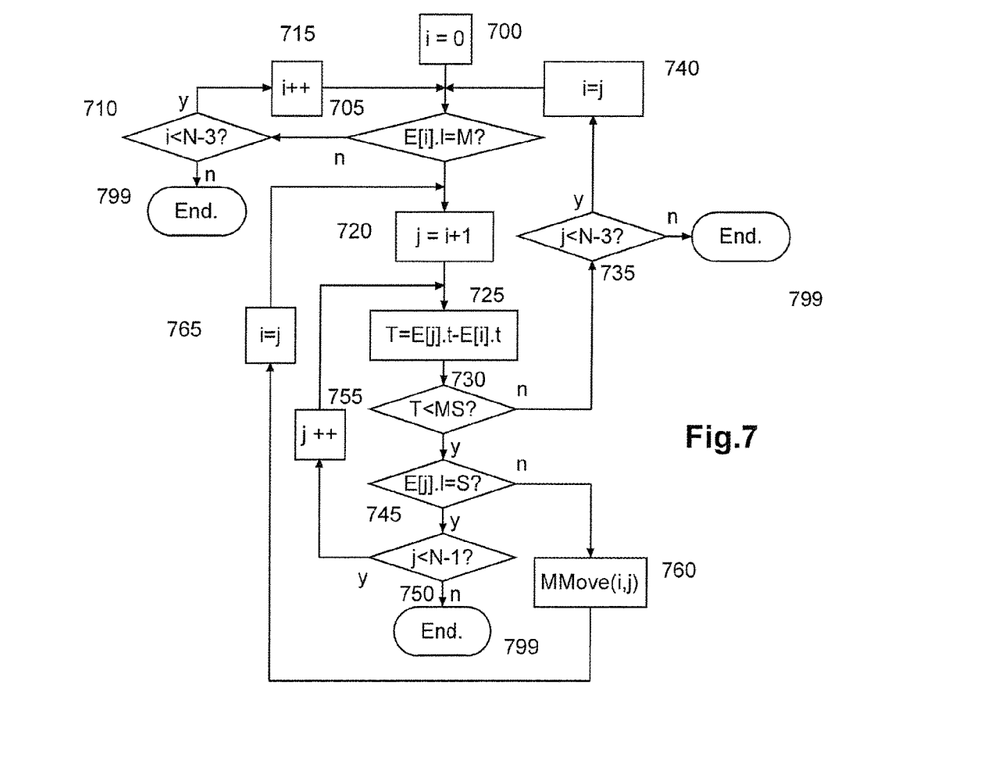

FIG. 7 represents another example of a function implemented by the analyzer 16. Indeed, when two events indicate a movement, and these events are separated by a duration below a third threshold indicating that a short stop is not possible, then the intermediate events are modified such that their displacement markers indicate a movement.

Thus, in an operation 700, a loop index i is initialized at 0. Next, in operations 705, 710 and 715 similar to the operations 605, 610 and 615, the event of index i is tested and incremented until an event indicating a movement is found. The only difference is that the operation 605 tests whether the event is of short stop type whereas the operation 705 tests whether the event is of movement type.

Next, a loop is launched in order to search for the event of index j whose displacement marker indicates a movement and whose time marker indicates a duration below the third threshold MS when compared to the time marker of the event of index i.

Thus, in an operation 720, an index j is defined as equal to i plus 1, then in an operation 725, a duration T between the time marker of the event of index j and the time marker of the event of index i is calculated.

Next, in an operation 730, the duration T is compared to the third threshold in order to determine whether the latter is exceeded or not. If such is the case, then a test similar to that of the operation 710 is carried out in an operation 735. If such is the case, then the index i is updated with the index j in an operation 740, and the next event indicating a movement is sought with the operation 705. If such is not the case, then the function is terminated in an operation 799.

If the duration T is below the third threshold, then, in an operation 745, a test determines whether the event of index j indicates a short stop. If such is the case, then, in an operation 750, a test determines whether it is the last operation of the list E. If such is the case, then the function is terminated with the operation 799. Otherwise, then the index j is incremented in an operation 755 and the loop restarts with the operation 725 until a second event indicating a movement is found, or until the third threshold MS is exceeded.

When a second event indicating a movement is found in the operation 745, a function MMove( ) is executed in an operation 760. The function MMove( ) receives as arguments the indexes i and j, to modify the displacement markers of the events between these indexes into movement. Finally, in an operation 765, the index i is updated with j (since the event of index j indicates a movement), and the loop restarts with the operation 720.

In the example described here, the third threshold MS is approximately 15 minutes. Thus, all the events associated with a short stop between two events associated with a movement and separated by less than 15 minutes. As a variant, the threshold MS could be greater, and for example be one hour. In other words, this function amounts to considering that a short stop between two movements is not an anomaly if it lasts longer than the third threshold MS.

Figure 8:
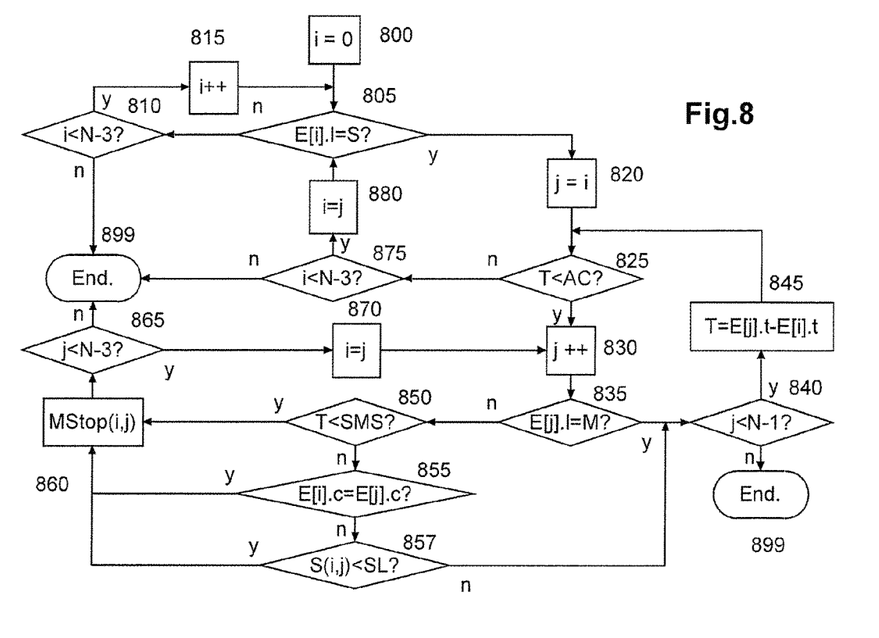

FIG. 8 represents another example of a function implemented by the analyzer 16. This function can be seen as a variant of the function represented in FIG. 4, or as a complement thereto, which can for example be executed after the function of FIG. 7.

In this function, the structure is similar, but the conditions sought differ:
 the first condition, the least constraining, differs in that the location cells associated with the two events are not identical, the first threshold itself being identical, and the speed of displacement between the two extreme short stops having to be below a threshold speed SL,
 the second condition is similar to the second condition of the function of FIG. 4, the second threshold being identical, but the location cells must here be identical.

Since the function of FIG. 8 is very close to that of FIG. 6, the numeric references have been kept the same, but adapting the hundreds digit. In fact, only the operations 850 and 855 differ from the operations 650 and 655, an operation 857 being added.

The operation 850 tests the second condition, and the combination of the operations 855 and 857 tests the first condition. In practice, the first condition should not be fulfilled, inasmuch as it corresponds to the same first condition as for the function of FIG. 4. However, it makes it possible to ensure that the function of FIG. 5 or any other function executed previously has not introduced any unwanted case.

The operation 857 tests whether the "as the crow flies" speed between the location cells associated with the events of indexes i and j is below a threshold speed SL of approximately 10 km/h. It is calculated by dividing the distance between the centers of the respective location cells by the duration between the two events. Thus, in the case where an event of noise type (for example if the mobile communication device is attached to a remote station by accident) could indicate a displacement between the events i and j, this test makes it possible to correct it. The operation 855 is also not assumed to occur in practice, but if that had to be the case, it makes it possible to not have to calculate the speed in the operation 857 which represents a precious time saving.

Once the analyzer 16 has executed the functions of FIGS. 4 to 8, it will simplify the resulting data to produce the trajectory data. For that, the analyzer 16 will merge all the successive signaling data indicating a short stop, and associate them, for a total duration corresponding to the difference between the time markers of the extreme events, with the location cell that is most represented.

Figure 9:
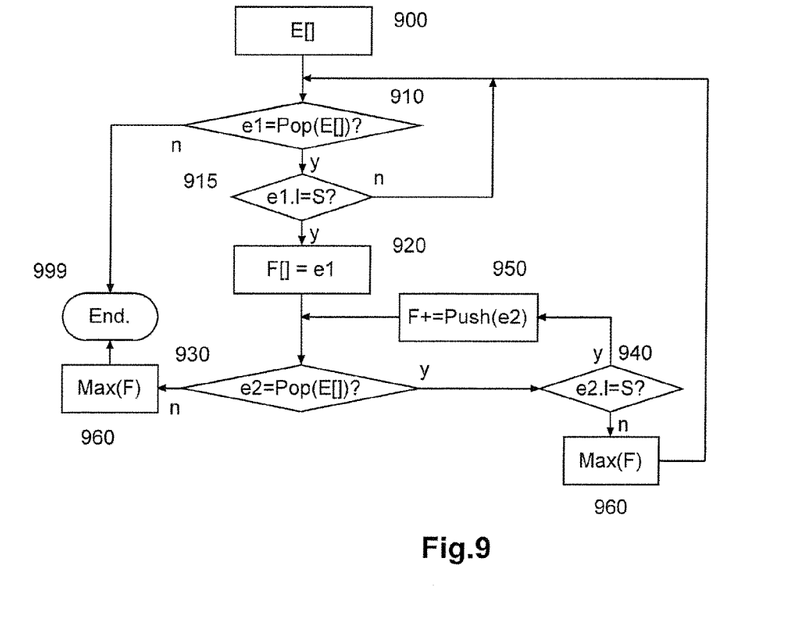

FIG. 9 represents an exemplary embodiment of this function. Thus, in an operation 900, the list of events E[ ] modified as previously is used as starting point.

Next, a loop will pop this list and aggregate the events indicating a short stop when necessary. For that, in an operation 910, the list E[] is popped in an event e1. When the list is empty, the function is terminated in an operation 999. In an operation 915, a test determines whether the event e1 indicates a short stop. When such is not the case, the operation 910 is repeated.

Next, in an operation 920, a list F[] is initialized with e1. The list F[] will receive all the successive events indicating a short stop. In an operation 930, the list E[] is once again popped, this time in an event e2. If there is no event e2, then, in an operation 940, a test determines whether the event e2 concerns a short stop. If such is the case, then the event e2 is introduced into the list F[] in an operation 950, and the operation 920 is repeated. When the next event e2 which indicates a movement is found in the operation 940, or when the operation 930 indicates that the list E[] ends with a series of short stops, a function Max( ) receiving the list F[] as argument is executed in an operation 960. The function of the function Max( ) is to merge the events of the list F[], by choosing the location cell that is most represented in terms of duration in the list F[], and by summarizing all the events of this list in a single event whose duration corresponds to the difference between the most extreme time markers of the list F[], associated with the chosen location cell.

Thus, the trajectory data produced at the output of the analyzer 16 contain series of events indicating a movement and/or a single event indicating a short stop.

In the example described here, the analyzer executes the functions of FIGS. 5 to 9 sequentially, and successively. Thus, the analyzer first of all executes the function of FIG. 3 on all of the data, then the function of FIG. 4 on the resulting data, etc. These successive functions make it possible to reduce the natural noise of the signaling data and to reduce their number, by producing trajectory data which acquire a "meaning" linked to the concept of displacement other than by foot.

The series of events which result therefrom are particularly advantageous because they exhibit a certain regularity which makes it possible to collect the paths together to establish statistics and/or attach a series of events to a known course. Furthermore, they make it possible to greatly reduce the noise which is inherent in the signaling data used as input, as well as to reduce the quantity of calculations to compare them with one another, by making it possible to define significant episodes.

Thus, the trajectory data which are produced represent segments which represent a tangible displacement, even if this displacement does not perfectly correspond to the original signaling data. They constitute an abstraction of the signaling data which makes it possible, by their nature which designates a movement or a short stop, to segment the original signaling data into significant episodes.

Furthermore, the notion of short stop makes it possible to concretely determine a presence in a given place for a given time band, which is almost impossible from only the signaling data. It also becomes possible to compare trajectories with reference trajectories.

Finally, the trajectory data constitute a form of compression of the signaling data: that makes computations over large volumes of location data possible. For example, the Applicant was able to reduce a volume of data associated with an airport from approximately 4 TB to only 100 GB. This reduction made it possible to render the processing of the trajectory data possible, whereas it was not with the original mass of data, except be adding a significant quantity of servers.

As a variant, the extractor 6 could be produced more simply, by applying only some of the functions presented with FIGS. 4 to 9. Furthermore, the extractor 6 applies the same functions to the trajectory data associated with a mobile telephony identifier and to the trajectory data associated with a computer network identifier. As a variant, different functions could be applied, in order to take account of the distinct natures of these types of network. Still as a variant, once the trajectory data have been calculated for all the identifiers, the trajectory data associated with one and the same identifier could be grouped together to form only a single set of trajectory data for each identifier.

In all the cases, the thresholds associated with the detection of trajectories for a mobile telephony identifier and the thresholds associated with the detection of a trajectory for a computer network identifier will not generally be the same, because the associated displacements are distinct. Indeed, in the case of the computer network identifiers, the user will often be walking, which will be less the case for the mobile telephony identifiers.

Furthermore, to take account of the displacement speed differences associated on the one hand with the mobile telephony network and on the other hand with the computer network, an additional operation of smoothing the trajectory data will be able to be carried out.

Figure 10:
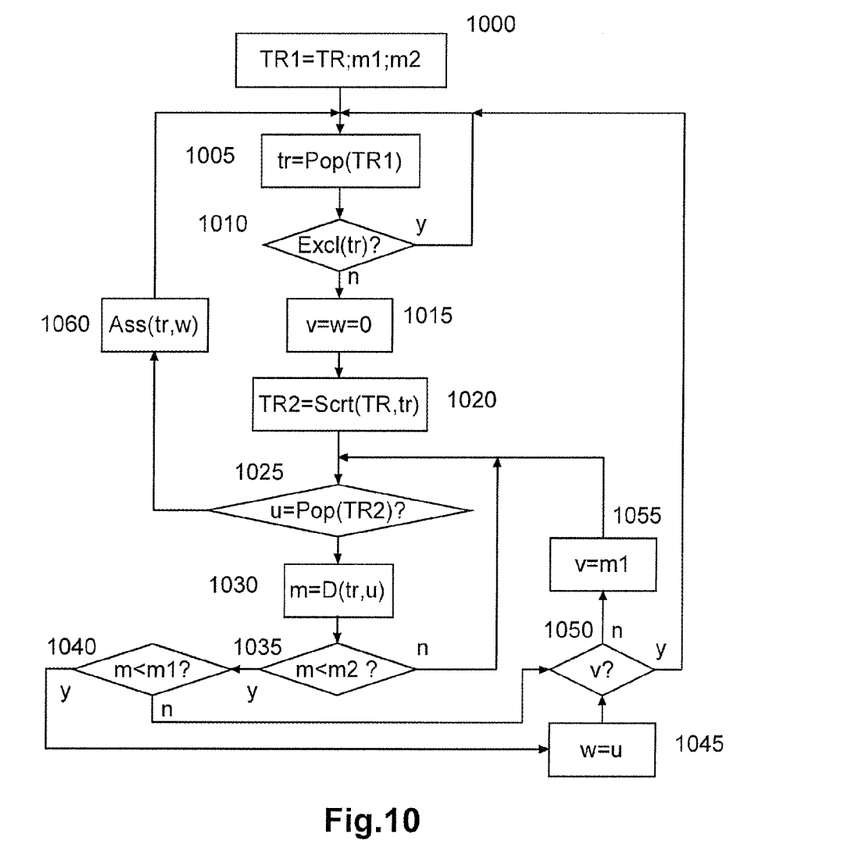
FIG. 10 represents an example of implementation of the matcher of FIG. 1.

On the basis of the trajectory data 18 determined by the extractor 6, the matcher 8 will produce mobile telephony identifier and computer network identifier pairs, in accordance with what is described with FIG. 10.

In an operation 1000, the matcher 8 receives the trajectory data 12 in the form of a list TR, a copy TR1 of the list TR, and two thresholds m1 and m2.

In an operation 1005, the list TR1 is popped by a function Pop( ) and returns trajectory data 10 tr associated with a mobile telephony identifier or with a computer network identifier. When there are no longer any trajectory data in the list TR1, the operation 200 is terminated.

Next, in an operation 1010, a function Excl( ) receives the trajectory data tr and tests whether the latter have to be discarded as a function of the desired matching conditions.

For example, for the use of the device 2 in a shopping center, it is not useful to take account of the trajectory data of the devices of personnel working in the shopping center. For that, the function Excl( ) will be able to filter the trajectory data associated with an identifier which show daily connections (of the type between 4 and 6 times per week) at working hours (by excluding meal times for example).

Similarly, it may be useful to filter the trajectory data associated with identifiers that connect only in the evening, outside of the opening hours, since these data likely correspond to personnel working at night, or to people living in proximity to the shopping center, but working elsewhere (and therefore not likely to visit it). Many exclusion rules will be able to be envisaged according to the application sought.

Thus, the operation 1010 is optional inasmuch as it is not necessary to the operation of the device 2, but it is nevertheless very advantageous because it makes it possible to reduce the number of comparisons in the operation 210. Now, as emerges hereinbelow, this operation exhibits a complexity of $O(N^2)$ type, where N is the number of trajectory data.

If the function Excl( ) determines that the trajectory data tr should not be the subject of a matching, the latter, and all the other trajectory data corresponding to the same identifier, are removed from the lists TR and TR1, and the function restarts with the operation 1005. Otherwise, the matcher 8 continues in an operation 1015 with the setting of variables v and w to zero. The variable v aims to avoid excessively aggressive matchings, and the variable w is used to receive the trajectory data to be associated, as will be explained below.

After the operation 1015, a function Scrt( ) is executed in an operation 1020. The function Scrt( ) aims, like the operation 1010, to limit the quantity of calculations. This operation can therefore be optional, even if it is very advantageous.

In its simplest version, the function Scrt( ) eliminates from the list TR all the trajectory data which correspond to the same type of identifier as that associated with the trajectory data tr (for example all the trajectory data associated with a mobile telephony identifier if the trajectory data tr designate a mobile telephony identifier), since the aim is to match together identifiers of distinct type. That could also be managed by storing the trajectory data associated with a mobile telephony identifier in a first list, and the trajectory data associated with a computer network identifier in a second list.

For greater sophistication, the trajectory data can also be filtered to keep only those which are contained within a time band surrounding the time band associated with the trajectory data tr, for example 1 h before and 1 h after. Indeed, it is not relevant to seek to associate trajectory data that are too far away in time.

According to another variant, it is possible to compare the occurrences of the trajectory data associated with each mobile telephony identifier and each computer network identifier.

Indeed, it is pointless comparing the trajectory data associated with two identifiers exhibiting a very different number of occurrences, since there is very little chance of the latter corresponding to one and the same mobile device.

According to yet another variant, it is possible to eliminate the trajectory data associated with a mobile telephony identifier or with a computer network identifier which exhibits only a limited number of occurrences, because there is too little chance of succeeding in matching these data.

When one or more of the above filters have been applied, the resulting trajectory data are stored in a list TR2.

A loop then begins in which the list TR2 will be popped to try to determine whether trajectory data can be associated with the trajectory data tr.

Thus, in a first loop operation 1025, the list TR2 is popped by means of the function Pop( ) and returns trajectory data u. Next, in an operation 1030, a function D( ) receives the trajectory data tr and u as arguments, and calculates a similarity value between these trajectories by applying a distance measurement to them.

This distance measurement is, in the example described here and preferred, the distance measurement LCSS (lowest common subsequence). As a variant, the DTW (dynamic time warping) or PF (Piciarelly and Foresti) measurements will be able to be used. Information on these distance measurements will be able to be drawn from the article "Learning Trajectory Patterns by Clustering: Experimental Studies and Comparative Evaluation" in the name of Morris et al., accessible on the internet at the address http://cvrr.ucsd.ed/publications/2009/morris_CVPR09.pdf. Other measurements will also be able to be used.

The result of the function D( ) is stored in a variable in, which is compared to the threshold m2 in an operation 1035. The threshold m2 is chosen to be greater than the threshold m1. The operation is as follows: the loop will seek to match the trajectory data tr with trajectory data u such that the distance between tr and u is below the threshold m1, but only if no other trajectory data exhibit a distance with the trajectory data tr below the threshold m2.

Thus, the matchings which are carried out exhibit a high reliability: not only is a maximum distance threshold guaranteed (m1), but it is also assured that no other trajectory data approach closer than the maximum distance threshold (m2).

That is important because there is no means of verifying that the matching is correct, and it is therefore crucial to limit the cases of incorrect matchings, in order to not disturb the users of the corresponding devices.

Consequently, if the operation 1035 indicates that the value m is above the threshold m2, the loop restarts with the operation 1025. Otherwise, the value in is once again compared, this time to the threshold m1, in an operation 1040.

If the value m is below the threshold m1, then, in an operation 1045, the trajectory data u are stored in a variable w. Next, or when the value m is above the threshold m1, an operation 1050 tests whether the current loop carries out an excessively aggressive matching or not. For that, the variable v is tested to determine whether it is nil.

Indeed, if v is non-null then there are two sets of trajectory data for which the distance to the trajectory data tr is below the threshold m2, which is not acceptable. In this case, the matching loop is terminated by the trajectory data t, and the function Match( ) restarts with the operation 1005.

If the operation 1050 indicates that the variable v is null, then the latter is initialized in an operation 1055. The variable v can be produced in the form of a flag in order to save on resources.

Next, the matching loop restarts with the operation 1025, until the list TR2 is empty or an excessively aggressive matching is detected. When the list TR2 is empty, a function Ass( ) is executed in an operation 1060. The function Ass( ) receives as argument the trajectory data tr and the variable w.

If the variable 2 is nil, the function Ass( ) does nothing. If the variable w has been filled in the matching loop, the function Ass( ) will create a pair associating the mobile telephony identifier or the computer network identifier associated with the trajectory data tr and the computer network identifier or the mobile telephony identifier associated with the trajectory data w.

Furthermore, in this case, it is no longer necessary to compare the other trajectory data associated with the same identifier as the trajectory data tr, and the function Ass( ) therefore removes the latter from the list TR, as well as the trajectory data associated with the same identifier as the trajectory data w.

Finally, the function Match( ) restarts with the operation 1005, until the list TR is empty.

A certain number of variants will emerge fairly rapidly in light of the above. Thus, if the distance measurement is commutative, the list TR can be ordered beforehand to contain, first, the trajectory data associated with a mobile telephony identifier or the trajectory data associated with a computer network identifier, and the function Match( ) can be stopped as soon all the trajectory data associated with a type of identifier have been processed.

Similarly, the above description still uses the trajectory data as variable. Nevertheless, optimizations will be able to be carried out by using identifiers designating these data as well as by including in the trajectory data the mobile telephony identifier or the computer network identifier which corresponds to them, and/or the number of trajectory data associated with this identifier and/or other information such as the associated time bands, etc.

In the example described with FIG. 10, there are a plurality of trajectory data for each identifier. As a variant, when the trajectory data associated with a given identifier have been collected, the operations of FIG. 10 could be adapted accordingly.

Once the trajectory data have been processed and the mobile telephony identifiers have been associated with the computer network identifiers, the function Detect( ) can give a value to these pairs by performing an active or passive geofencing of the identifiers forming part of a pair.

Thus, as soon as such an identifier is detected at the edges of a zone of interest, a message can be transmitted, over the mobile telephony network or over the computer network, in the form of a text or multimedia message. That can be very useful for broadcasting critical information (fire, accident, missing person, etc.), or even to offer services to the users in the zone concerned (to indicate them to services which could be of interest to them, offer them discounts, etc.).

Thus, the transmitter 10 which executes the function Detect( ) can include a mobile telephony or computer network transmitter or send the orders to such a transmitter. Similarly, the transmitter 10 can perform the active or passive geofencing function, or be invoked in response to the detection of a mobile telephony identifier or of a computer network identifier.

The invention also makes it possible to associate a mobile telephony identifier and a computer network identifier of two telecommunication devices that are distinct but carried and/or used by one and the same person.

The invention claimed is:

1. A communication device comprising:
a memory for receiving event data associating signaling data, a time marker, and a mobile telephony identifier or a computer network identifier;
an extractor arranged to calculate a trajectory data, from the event data signaling data comprising time markers designating consecutive instants associated with a unique mobile telephony identifier or a unique computer network identifier; and
a matcher arranged to calculate a similarity value between the trajectory data, and to associate at least one mobile telephony identifier and one computer network identifier as a function of the similarity value calculated for the trajectory data which are associated with them;
wherein the memory is arranged to receive signaling data associating mobile communication device identifiers, time markers and signaling identifiers, at least some of the signaling identifiers designating a location cell, and wherein the extractor further comprises:
a classifier capable, for a given mobile communication device identifier, of marking the signaling data which are associated with it with a displacement marker indicating a state chosen from a list comprising at least a movement and a short stop;
an analyzer capable of processing the marked signaling data as a function of the displacement markers in order to produce trajectory data associating, a given mobile communication device identifier and a series of displacement markers each associated with a location cell and with a time marker, so that two displacement markers whose time markers indicate that they follow one another designate distinct states, by applying at least one of the following rules:

a) the modification of any displacement markers into displacement markers indicating a short stop, when, two displacement markers indicating a short stop associated with a single location cell, the number of displacement markers whose time markers indicate that they are between these two displacement markers is less than or equal to 4;
b) the modification of displacement markers indicating a movement into displacement markers that indicate a short stop when the time markers which are associated with the displacement markers indicate that they are preceded and followed by displacement markers indicating a short stop and that the time markers associated with the latter indicate a duration below a first threshold;
c) the modification of displacement markers indicating a movement into displacement markers that indicate a short stop when the time markers which are associated with the displacement markers indicate that they are preceded and followed by displacement markers indicating a short stop which are associated with one and the same location cell and that the time markers associated with the latter indicate a duration below a second threshold;
d) the modification of displacement markers indicating a short stop into displacement markers indicating a movement when the time markers which are associated with the displacement markers indicate that they are preceded and followed by displacement markers indicating a movement and that the time markers associated with the latter indicate a duration below a third threshold;
e) the merging of displacement markers indicating a short stop whose time markers indicate that they are consecutive, and the association with the resulting displacement marker of the location cell associated with the displacement markers whose time markers represent the greatest duration and a time marker corresponding to the sum of the durations of the associated time markers.

2. The device as claimed in claim 1, wherein the matcher discards the trajectory data associated with a mobile telephony identifier or with a computer network identifier which designate one and the same position and which, for a given time period, exhibit a number of occurrences above a chosen threshold.

3. The device as claimed in claim 2, wherein the matcher calculates the similarity value from a distance chosen from a group comprising a dynamic time warping, a lowest common subsequence, and a piciarelly and foresti distance.

4. The device as claimed in claim 1, wherein the matcher calculates the similarity value from a distance chosen from a group comprising a dynamic time warping, a lowest common subsequence, and a piciarelly and foresti distance.

5. The device as claimed in claim 1, wherein the matcher associates a given mobile telephony identifier with a given computer network identifier when the similarity value of their associated trajectory data is below a chosen threshold.

6. The device as claimed in claim 5, wherein the matcher disassociates a mobile telephony identifier from a computer network identifier, which identifiers are associated, when the similarity value between the trajectory data associated with said mobile telephony identifier and trajectory data associated with another computer network identifier or the similarity value between the trajectory data associated with said computer network identifier and trajectory data associated with another mobile telephony identifier is below a chosen threshold.

7. The device as claimed in claim 1, further comprising a transmitter arranged, upon detection of a computer network identifier associated by the matcher with a mobile telephony identifier, to transmit a telephone message of text or multimedia type to the device designated by said mobile telephony identifier.

8. The device as claimed in claim 1, further comprising a transmitter arranged, upon detection of a mobile telephony identifier associated by the matcher with a computer network identifier, to transmit a computer message of text or multimedia type to the device designated by said computer network identifier.

9. The device as claimed in claim 1, wherein the classifier and the analyzer are called sequentially to produce trajectory data, and/or wherein the analyzer applies a rule selected from the group consisting of the rule a) before applying the rule b), the rule b) before applying the rule c), the rule c) before applying the rule d), and one of the rules a), b), c) and d) before applying the rule e) and any combination thereof.

10. A computer program product embodied on a non-transitory computer readable medium comprising program code portions for implementing the device as claimed in claim 1, wherein said program product is run on a computer.

11. A communication method comprising the following operations:
- a) receiving event data associating signaling data, a time marker, and a mobile telephony identifier or a computer network identifier;
- b) calculating trajectory data, from the event data signaling data, comprising time markers designating consecutive instants associated with a unique mobile telephony identifier or a unique computer network identifier;
- c) calculating a similarity value between trajectory data associated with a mobile telephony identifier and a computer network identifier; and
- d) associating at least one mobile telephony identifier and one computer network identifier as a function of the similarity value calculated for trajectory data which are associated with them; and
    receiving signaling data associating mobile communication device identifiers, time markers and signaling identifiers, at least some of the signaling identifiers designating a location cell; and
    for a given mobile communication device identifier marking the signaling data associated with it with a displacement marker that indicates a state chosen from a list comprising at least a movement and a short stop;
    processing the marked signaling data as a function of the displacement markers to produce trajectory data associating a given mobile communication device identifier and a series of displacement markers each associated with a location cell and with a time marker, such that two displacement markers whose time markers indicate that they follow one another designate distinct states, by applying at least one of the following rules:
- a1) modifying any displacement markers into displacement markers indicating a short stop when, two displacement markers indicate a short stop associated with a single location cell, the number of displacement markers whose time markers indicate that they are between these two displacement markers is less than or equal to 4;
- b1) modifying displacement markers indicating a movement into displacement markers that indicate a short stop when the time markers which are associated with the displacement markers indicate that they are preceded and followed by displacement markers indicating a short stop and that the time markers associated with the latter indicate a duration below a first threshold;
- c1) modifying displacement markers indicating a movement into displacement markers that indicate a short stop when the time markers which are associated with the displacement markers indicate that they are preceded and followed by displacement markers indicating a short stop which are associated with one and the same location cell and that the time markers associated with the latter indicate a duration below a second threshold;
- d1) modifying displacement markers indicating a short stop into displacement markers that indicate a movement when the time markers which are associated with the displacement markers indicate that they are preceded and followed by displacement markers indicating a movement and that the time markers associated with the latter indicate a duration below a third threshold;
- e1) merging displacement markers indicating a short stop whose time markers indicate that they are consecutive, and the association with the resulting displacement marker of the location cell associated with the displacement markers whose time markers represent the greatest duration and a time marker corresponding to the sum of the durations of the associated time markers.

12. The method as claimed in claim 11, wherein the operation d) comprises associating a given mobile telephony identifier with a given computer network identifier when the similarity value of their associated trajectory data is below a chosen threshold.

13. The method as claimed in claim 12, wherein the operation d) comprises the dissociation of a mobile telephony identifier from a computer network identifier, which identifiers are associated, when the similarity value between the trajectory data associated with said mobile telephony identifier and trajectory data associated with another computer network identifier or the similarity value between the trajectory data associated with said computer network identifier and trajectory data associated with another mobile telephony identifier is below a chosen threshold.

14. The method as claimed in claim 13, further comprising the operation of:
- e) detecting a mobile telephony identifier associated in the operation d) with a computer network identifier and transmitting in response a computer message of text or multimedia type to the device designated by said computer network identifier.

15. The method as claimed in claim 12, further comprising the operation of:
- e) detecting a mobile telephony identifier associated in the operation d) with a computer network identifier and transmitting in response a computer message of text or multimedia type to the device designated by said computer network identifier.

16. The method as claimed in claim 11, further comprising the operation of:
- e) detecting a mobile telephony identifier associated in the operation d) with a computer network identifier and transmitting in response a computer message of text or multimedia type to the device designated by said computer network identifier.

17. The method as claimed in claim 11, further comprising the operation of:
- f) detecting a computer network identifier associated in the operation d) with a mobile telephony identifier and transmitting in response a telephone message of text or multimedia type to the device designated by said mobile telephony identifier.

18. A computer program product embodied on a non-transitory computer readable medium comprising program code portions for implementing the method as claimed in claim 11, wherein said program product is run on a computer.

\* \* \* \* \*